United States Patent [19]
Nishihira

[11] Patent Number: 4,734,803
[45] Date of Patent: Mar. 29, 1988

[54] MAGNETIC HEAD AIR BEARING SLIDER
[75] Inventor: Henry S. Nishihira, San Jose, Calif.
[73] Assignee: International Business Machines, Armonk, N.Y.
[21] Appl. No.: 841,646
[22] Filed: Mar. 20, 1986
[51] Int. Cl.$^4$ ............................................ G11B 21/20
[52] U.S. Cl. .................................................... 360/103
[58] Field of Search ........................................ 360/103

[56] References Cited
U.S. PATENT DOCUMENTS

| | | | |
|---|---|---|---|
| 3,823,416 | 7/1974 | Warner | 360/122 |
| 4,214,287 | 7/1980 | Stromsta et al. | 360/103 |
| 4,225,891 | 9/1980 | Plotto | 360/103 |
| 4,475,135 | 10/1984 | Warner et al. | 360/103 |

FOREIGN PATENT DOCUMENTS 0129336 12/1984 European Pat. Off. ............ 360/103
60-101781 6/1985 Japan .................................. 360/103

Primary Examiner—A. J. Heinz
Attorney, Agent, or Firm—Otto Schmid, Jr.

[57] ABSTRACT

An air bearing slider is provided for supporting a magnetic transducer and the slider comprises a pair of coplanar side rails disposed on the sides of an air bearing surface of the slider to form a recessed section between the side rails which is open at both the leading and trailing ends of the slider. The side rails have a tapered height section at the leading end and a width that decreases to a break point located between the ends. The air bearing structure produces a combined pressure profile which causes the slider to fly with the leading end at a desired pitch angle relative to a moving magnetic medium, with the minimum spacing between the slider and the magnetic medium at the trailing end, where the magnetic transducer is mounted.

9 Claims, 11 Drawing Figures

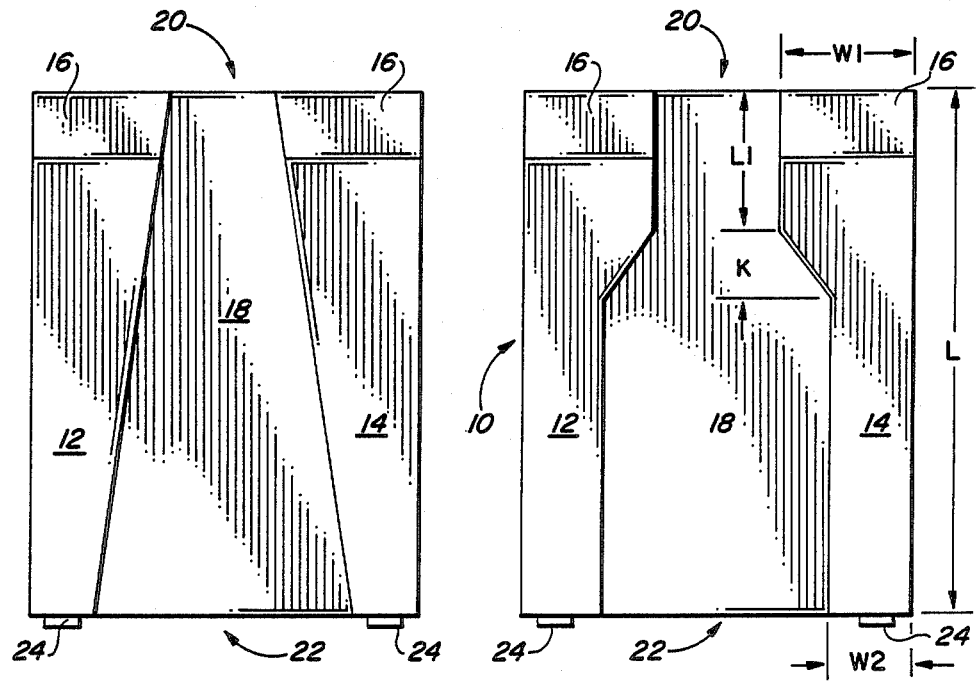
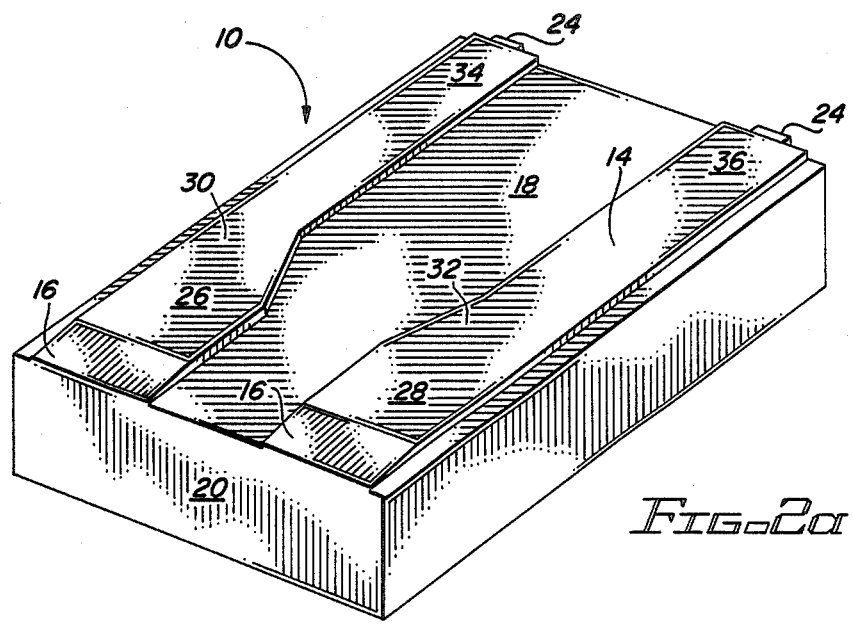

MAGNETIC HEAD AIR BEARING SLIDER

BACKGROUND OF THE INVENTION

1. Field of the Invention

This invention relates to a magnetic head slider assembly, and more particularly to a magnetic head slider which develops an air bearing to maintain a close spacing between the magnetic head and a recording surface.

2. Description of the Prior Art

Magnetic head assemblies that fly relative to magnetic media have been used extensively. These assemblies provide a noncontact transducing relationship between a magnetic transducer and a magnetic recording medium, such as a rotating magnetic disk, so that a stable constant spacing can be maintained between the transducer and the disk. In magnetic recording technology it is continually desired to improve the areal density at which information can be recorded and reliably read. This desire has led to a trend toward greater bit density along a magnetic recording track and a shrinking track width. The greater bit density requires increasingly narrow transducing gaps, so it becomes more difficult to achieve the low flying height required and to maintain this flying height constant to the degree required to reliably record and read data at the higher data rates.

The so-called taper-flat air bearing slider has been widely used, and this slider comprises two side rails, a recessed area between the side rails and a taper formed across the leading end of the side rails. A three rail embodiment is shown in U.S. Pat. No. 3,823,416 to Warner. Some taper-flat air bearing sliders have the pivot point for suspension attachment located back of the center line of the slider. A disadvantage of this slider occurs since the resulting imbalance produces increased yaw motion during accessing which results in a longer settling time once the desired track is reached and therefore a longer access time. A central pivot suspension attachment eliminates this impact to access time. However, this solution results in a decrease of the flying pitch angle and an increase in the flying height. While it is possible to reduce the side rail width to maintain the original flying height, the flying pitch angle may not be optimum for stability and dynamic performance thereby making it difficult to meet the reliability requirements for recording and reading data at the higher data rates.

Independent of suspension attachment, one way to produce a lower flying height for a taper-flat air bearing slider to meet the greater bit density requirements is to reduce the slider rail width. While this proposal is operable to achieve a lower flying height, a resultant disadvantage is that the slider flies at a pitch angle that is not optimum.

The prior art has not shown a taper-flat slider which is capable of flying at a reduced flying height without decreasing the pitch angle and/or increasing the access time.

SUMMARY OF THE INVENTION

It is therefore the principle object of this invention to provide an air bearing slider which produces a pressure profile which causes the slider to fly at a reduced flying height and at a desired pitch angle with respect to a moving magnetic medium without increasing the access time.

In accordance with the present invention, an air bearing slider is provided for supporting a transducer and the slider comprises a pair of substantially coplanar side rails disposed along the sides of an air bearing surface of the slider to form a recessed section between the side rails which is open at both the leading and trailing ends of the slider. The side rails have a tapered height section at the leading end of the slider and a width that decreases to a point that is remote from the leading end.

This air bearing slider structure produces a combined pressure profile which causes the slider to fly with the leading end at a desired pitch angle with respect to a moving magnetic medium, such as a magnetic disk, with the minimum spacing between the slider and the magnetic medium at the trailing end, where the magnetic transducer is mounted. This air bearing slider structure also permits the flying pitch angle to be chosen independent of the flying height so that the desired dynamic performance and stability can be achieved in order to minimize contact with the magnetic medium. In addition, this slider structure does not adversely affect the access time for the storage system in which the slider is used.

In a specific embodiment, the slider has side rails having a first predetermined width at the leading end of the slider, and substantially parallel sides extending to a taper section. The taper section ends at a break point at which the side rails have a second predetermined width that is substantially less than the first predetermined width, and the side rails have substantially parallel sides extending from the breakpoint to the trailing end of the slider.

In a second specific embodiment, the side rails are flared out at the trailing end of the slider. This embodiment has the advantage of providing a greater area at the trailing end of the side rails so that this added area is available for deposition of the magnetic transducer, if required.

BRIEF DESCRIPTION OF THE DRAWINGS

The foregoing and other objects, features and advantages of the invention will be apparent from the following more particular description of a preferred embodiment of the invention as illustrated in the accompanying drawing.

FIG. 1 is a bottom plan view of an air bearing slider embodying the present invention.

FIG. 2a shows a three dimensional front bottom view of a specific embodiment of the air bearing slider embodying the present invention;

FIG. 2b is a bottom plan view of the slider shown in FIG. 2a.

DESCRIPTION OF THE PREFERRED EMBODIMENTS

Figure 3:
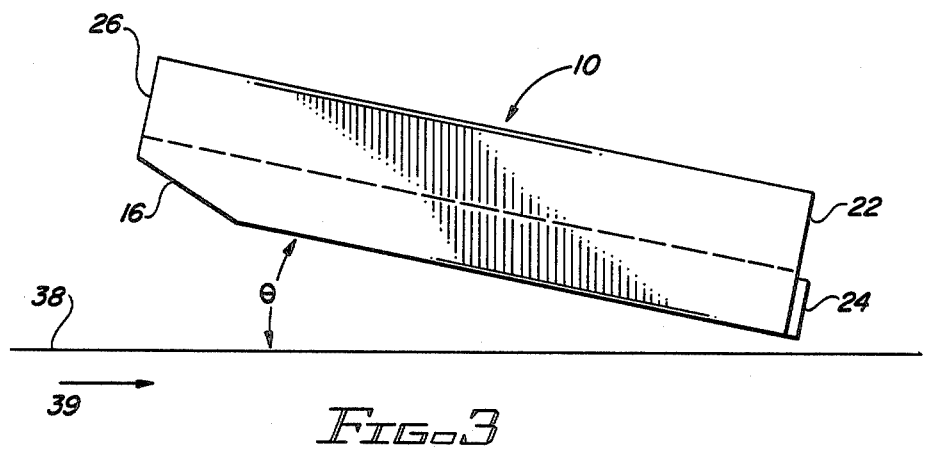
FIG. 3 is a side elevation view of the sliders of FIG. 1 and FIG. 2.
Figure 4:
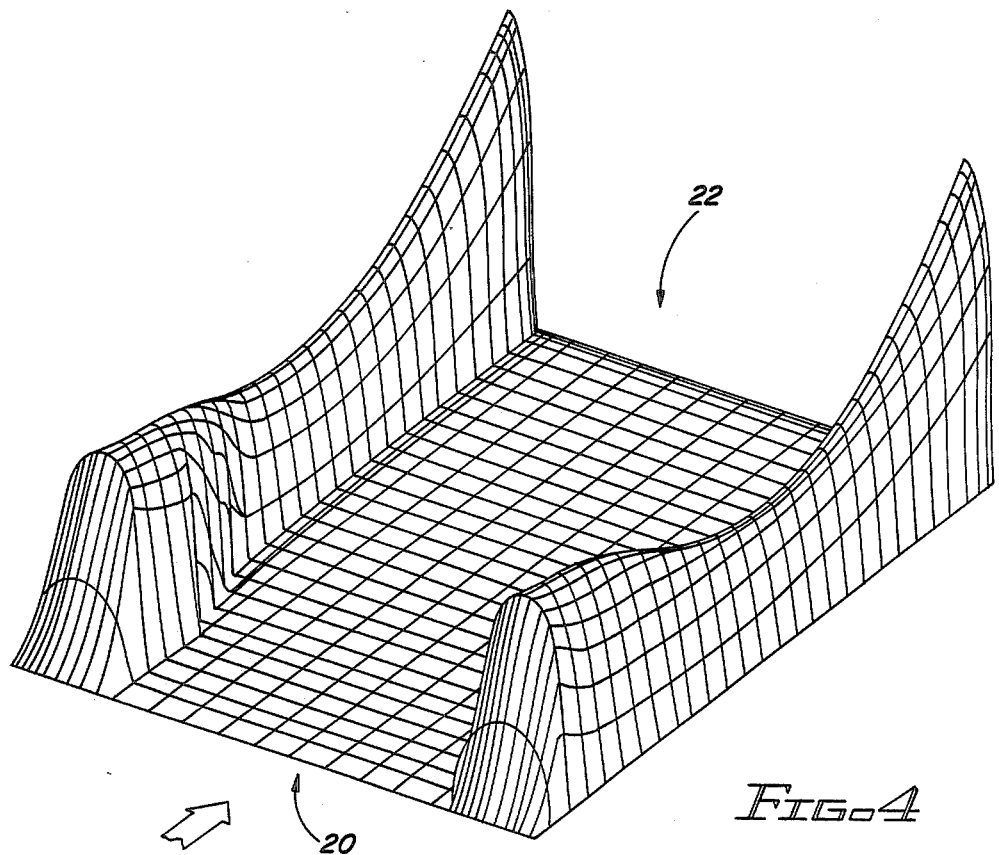
FIG. 4 is a representation of a pressure profile indicating the distribution of pressure, as measured along the air bearing surface of the slider of FIG. 2.

With reference to the Figures of the drawing, the air bearing surface of a magnetic head slider 10, made in accordance with the invention, is formed with two side rails 12 and 14. The inner sides of the two rails border on a recessed section 18 that is formed by etching, ion milling, or other machining techniques, for example. The recessed section 18 extends from the leading end 20 of the slider to the trailing end 22 of the slider. Magnetic transducers 24, preferably of the thin film type, are bonded at the trailing end of each of the rails 12 and 14 with transducing gaps flush with the rail surface. The side rails 12 and 14 have a tapered height section 16 at the leading end 20 and a width that is wide at the leading end and decreases to a point located remote from the leading end. In the embodiment of the invention shown in FIG. 1, the side rails 12 and 14 are widest at the leading end and decrease to their narrowest point at the trailing end 22 of the slider.

In the preferred embodiment of the invention shown in FIG. 2, each of the side rails 12 and 14 has the leading end formed as a taper section 16. Each of the side rails 12 and 14 includes a wide section 26 and 28 at the leading end 20 of the slider having substantially parallel sides and a width W1 followed by a flared section 30 and 32. Flared sections 30 and 32 extend to a break point from which they are followed by narrow sections 34 and 36 having substantially parallel sides and a width W2 that is less than the width W1. Narrow sections 34 and 36 extend to the trailing end 22 of the rails 12 and 14.

The configuration of the slider 10 which is shown in FIGS. 1 and 2 has different pressure zones as can be seen by reference to FIG. 3. The pressure zones are formed when the slider is positioned adjacent to a magnetic surface 38 (FIG. 3) moving in the direction of arrow 39 to provide load forces on the slider assembly that are balanced in such a manner that the desired flying characteristics for the slider can be achieved. The slider has a positive pressure zone along the side rails 12 and 14, a near ambient zone in recessed section 18, and a small negative pressure zone adjacent the flared sections 30 and 32.

The pressure components are combined so that the slider 10 flies at a desired pitch angle $\theta$ (FIG. 3) relative to a moving magnetic disk surface 38 with an attitude by which the trailing end 22 of slider 10, where the transducer 24 is mounted, is closest to the disk surface 38.

Two of the factors which establish the pitch angle $\theta$ are the ratio of the width W1 of the wide rail section 26 and 28 to the width W2 of the narrow rail section 34 and 36, and the ratio of the length L1 of the wide rail section to the overall length L of the slider. In the accompanying drawings, the ratio W1/W2 is referred to as the rail ratio, and the ratio L1/L is referred to as the length ratio and the length of the flared sections 30 and 32 is a constant K. A rail ratio and a length ratio can be chosen to produce the pitch angle $\theta$ desired to compensate for a forward movement of the suspension attachment, the lowering of the flying height or any other reason.

Figure 5:
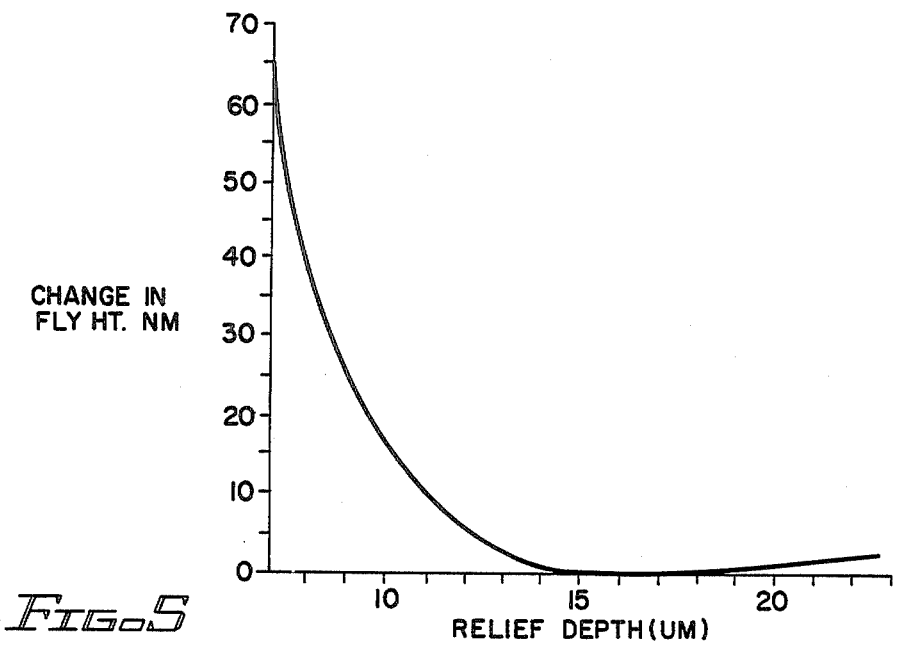
FIG. 5 is a graph plotting the change in flying height vs. relief depth for the embodiment of the slider shown in FIG. 2.

Another factor which establishes the flying characteristics of the slider is the relief depth of the recessed section 18. As shown in FIG. 5, the flying height of the embodiment shown in the drawings varies significantly when the depth is small. However, for depths greater than about 15 microns, the flying height changes very little with depth, thus allowing reasonable manufacturing tolerances.

Figure 6:
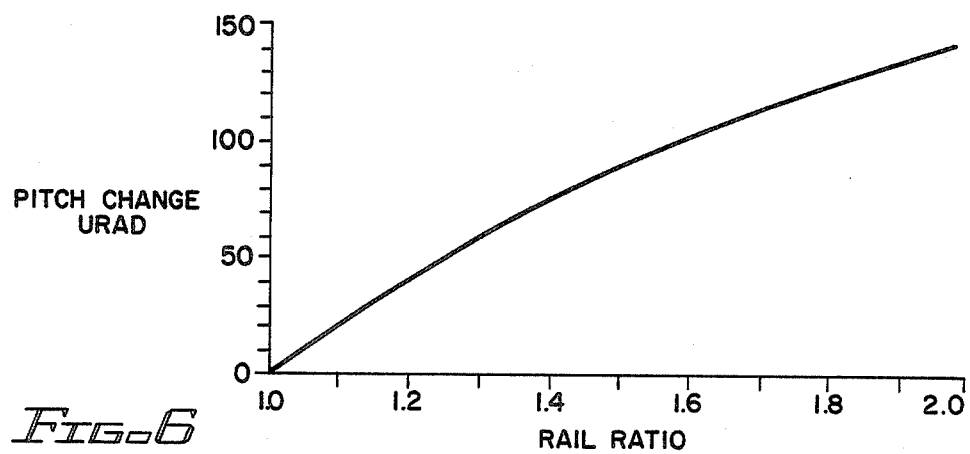
FIG. 6 is a graph plotting the change in pitch angle vs. rail ratio for a slider similar to that shown in FIG. 2.
Figure 7:
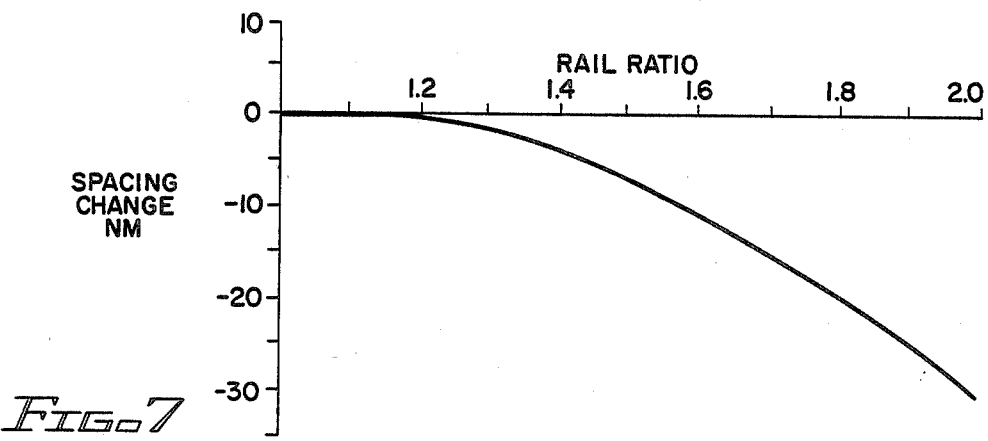
FIG. 7 is a graph plotting spacing change vs. rail ratio for the slider of FIG. 6.
Figure 8:
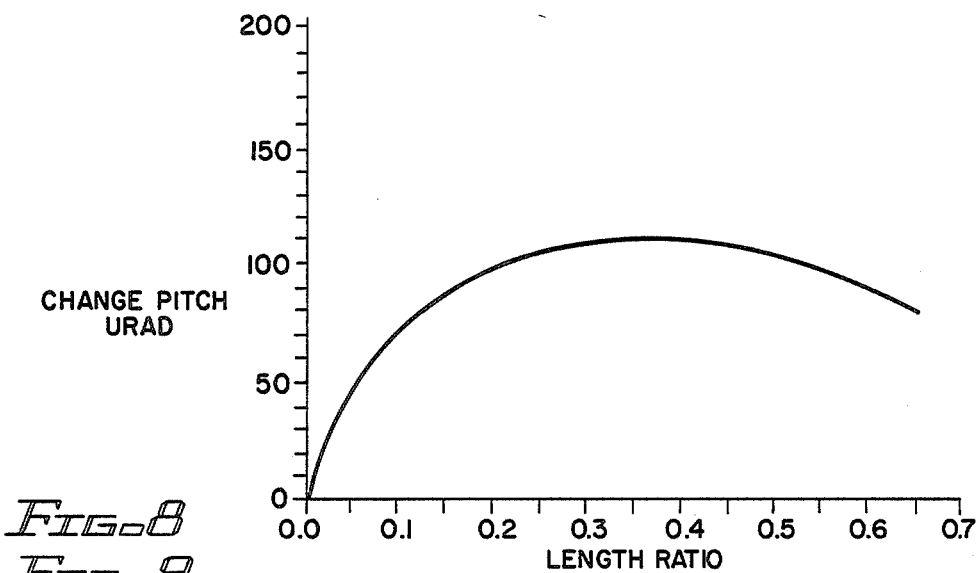
FIG. 8 is a graph plotting the change in pitch angle vs. length ratio for a slider similar to that shown in FIG. 2.
Figure 9:
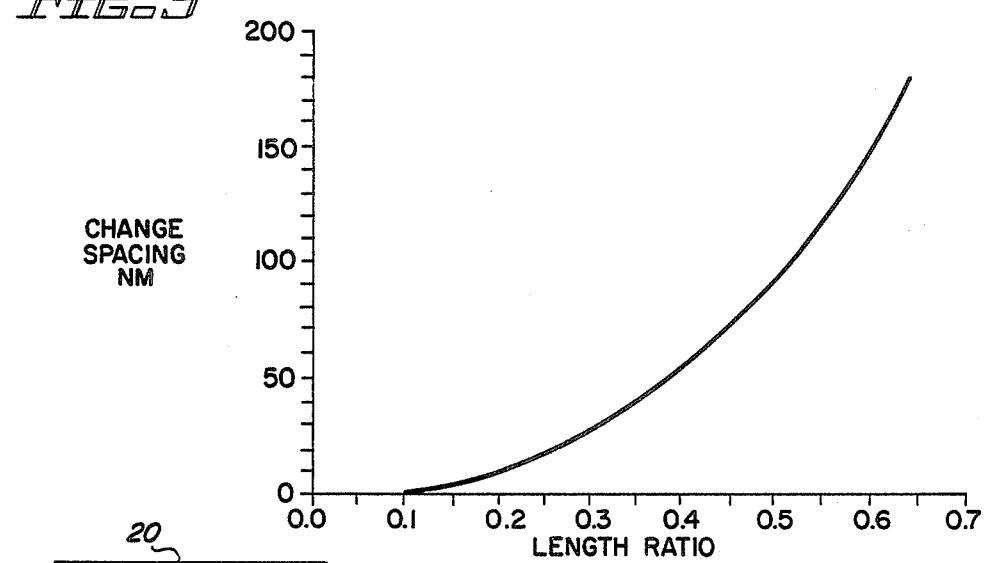
FIG. 9 is a graph plotting spacing change vs. length ratio for the slider of FIG. 8.

FIG. 6 shows that, in a specific embodiment similar to that shown in FIG. 2, the change in pitch angle $\theta$ increases approximately linearly with increasing rail ratio for a specific length ratio. Increasing the length ratio causes the pitch to be more sensitive to rail ratio. FIG. 7 shows a plot for apparatus having the same length ratio as FIG. 6, and FIG. 7 shows that the change in spacing goes down for rail ratios over and above 1.2 for the length ratio plotted. As the length ratio is increased, the curve tends to flatten and eventually goes positive. FIG. 8 shows that the change in pitch angle $\theta$ increases to a length ratio of about 0.4 and then begins to decrease for the value of rail ratio plotted. Increasing the rail ratio causes increased sensitivity of the length ratio to changes in flying height. FIG. 9 shows that the change in spacing increases with length ratio for the same rail ratio as that plotted in FIG. 8. The change is gradual to a length ratio of about 0.25 and then increases at a greater rate for length ratios above 0.25. Increasing the rail ratio causes an increased sensitivity of length ratio to spacing change.

Figure 10:
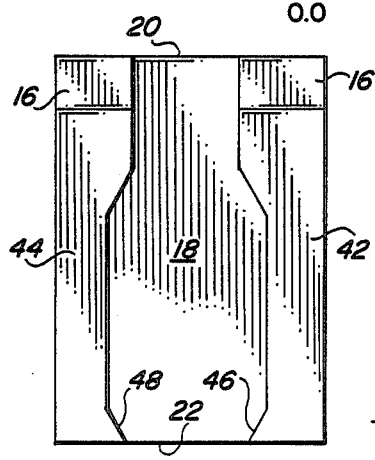
FIG. 10 is a bottom plan view of an alternate embodiment of the air bearing slider embodying the present invention.

An alternate embodiment of the invention is shown in FIG. 10. To meet the requirements for track width and recording density, the required magnetic transducer may have a greater area than that provided by the rails in the FIGS. 1 and 2 embodiment. To provide additional area for the magnetic transducer 40 the trailing end of the rails 42 and 44 is provided with a flared-out section 46 and 48. Since the flared section 46 and 48 produces only a slight change in the positive pressure at the trailing end of the rails, no significant effect on flying attitude of the slider is produced.

While the invention has been particularly shown and described with reference to a preferred embodiment thereof, it will be understood by those skilled in the art that various other changes in the form and details may be made therein without departing from the spirit and scope of the invention. For example, suitable contours, other than those shown in the drawings, can be used for both the inner and outer sides of the side rails to obtain the desired flying characteristics for the slider, and these contours are characterized by a width that is wide at the leading end and decreases to a point located between the ends of the slider.

Having thus described my invention, what I claim as new, and desire to secure by Letters Patent is:

1. In a multirail air bearing slider for supporting a transducer:

a slider body having leading and trailing ends and an air bearing surface;

a pair of substantially coplanar side rails disposed along the sides of said air bearing surface to form a recessed section, open at both the leading and trailing ends of said slider, between said side rails;

each said side rails having a tapered section at the leading end and a width, as measured normal to the leading to trailing dimension of said slider, that decreases to a predetermined value at a point remote from said leading end, and wherein said width of said side rails does not substantially exceed said predetermined value between said point and said trailing end of said slider.

2. The air bearing slider as in claim 1, wherein said rails and said recessed section produce a combined pressure profile, when said slider is positioned adjacent a moving magnetic recording medium, so that said slider assumes an orientation having a predetermined pitch angle and a predetermined spacing with respect to said moving magnetic medium in which the minimum spacing between said slider and said magnetic medium occurs at the trailing end of said slider.

3. The air bearing slider as in claim 2, wherein the width of said side rails does not substantially exceed the width of said side rails at said leading end of said slider.

4. An air bearing slider for supporting a transducer comprising:
a slider structure having leading and trailing ends and an air bearing surface;
side rails disposed along the sides of said air bearing surface of said slider structure, said rails being substantially coplanar and extending from the leading end of said slider structure to the trailing end of said slider structure, said side rails having a tapered section formed on the air bearing surface at said leading end; each said side rails comprising a first part having a first predetermined width, as measured normal to the leading to trailing dimension of said slider, at said leading end of said side rail structure and a width that decreases to a second part having a second predetermined width at a break point, said break point being located between said leading end and said trailing end of said side rails, and wherein said width of said side rails does not substantially exceed said second predetermined width between said break point and said trailing end of said side rails; and
a recessed section of said slider structure, said recessed section occupying the space on said air bearing surface between said side rails, said recessed section being open at both the leading end and the trailing end of said slider structure.

5. The air bearing slider as in claim 4, wherein said rails and said recessed section produce a combined pressure profile, when said slider is positioned adjacent a moving magnetic medium, so that said slider assumes an orientation having a predetermined pitch angle and a predetermined spacing with respect to said moving magnetic recording medium in which the minimum spacing between said slider and said magnetic medium occurs at the trailing end of said slider.

6. The air bearing slider as in claim 5, wherein the width of said side rails does not substantially exceed the width of said side rails at said leading end of said slider.

7. The air bearing slider as in claim 5, wherein the width of said side rails exceeds said second predetermined width in close proximity to said trailing end only so that no significant change in said predetermined pitch angle or said predetermined spacing is produced.

8. The air bearing slider as in claim 4, wherein the parts of said side rails having said first and said second predetermined widths are connected by a flared section.

9. The air bearing slider as in claim 8, wherein said parts of said side rails having said first and said second predetermined widths have sides that are substantially parallel.

* * * * *